(12) United States Patent
Agostini et al.

(10) Patent No.: US 6,555,606 B1
(45) Date of Patent: Apr. 29, 2003

(54) PREPARATION OF RUBBER COMPOSITION BY ORGANIC SOLUTION MIXING AND ARTICLES THEREOF INCLUDING TIRES

(75) Inventors: Giorgio Agostini, Colmar-Berg (LU); Rene Jean Zimmer, Howald (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/528,528

(22) Filed: Mar. 20, 2000

(51) Int. Cl.[7] .............................. C08K 5/36; C08K 9/02; C08K 9/06
(52) U.S. Cl. ..................... 524/264; 524/265; 524/287; 524/493; 523/200; 523/216; 523/205
(58) Field of Search ................................ 524/264, 265, 524/287, 493; 523/200, 216, 205

(56) References Cited

U.S. PATENT DOCUMENTS

| | | | |
|---|---|---|---|
| 3,294,733 A | 12/1966 | Medalia et al. | 260/41.5 |
| 3,298,984 A | 1/1967 | Rye | 260/29.3 |
| 3,304,281 A | 2/1967 | Tucker | 260/33.6 |
| 3,317,458 A | 5/1967 | Clas et al. | 260/41.5 |
| 3,345,324 A | 10/1967 | Bristol et al. | 260/41.5 |
| 3,350,342 A | 10/1967 | Begley | 260/33.6 |
| 3,491,052 A | 1/1970 | Hare et al. | 260/29.7 |
| 3,533,988 A | 10/1970 | Morris et al. | 260/41.5 |
| 3,767,605 A | 10/1973 | Gerlicher | 260/23.7 |
| 3,923,707 A | 12/1975 | Berg et al. | 260/17 |
| 4,532,272 A | * 7/1985 | Wilt et al. | 523/330 |
| 4,578,411 A | 3/1986 | Budd et al. | 524/156 |

FOREIGN PATENT DOCUMENTS

| | | | |
|---|---|---|---|
| FR | 2804119 | 7/2001 | C08J/3/22 |
| GB | 896309 | 11/1960 | |

* cited by examiner

Primary Examiner—David W. Wu
Assistant Examiner—R. Harlan
(74) Attorney, Agent, or Firm—Henry C. Young, Jr.

(57) ABSTRACT

This invention relates to preparation of a rubber composition by pre-mixing at least one rubber compounding ingredient with an organic solvent solution of at least one elastomer. The invention also contemplates the use of such rubber composition, or blend of such rubber composition with at least one additional elastomer and/or rubber compounding ingredient, as a component of an article of manufacture. Such article of manufacture may be, for example, a tire. Such article may also be an industrial product such as, for example, a hose or belt such as a conveyor belt or power transmission belt.

6 Claims, 1 Drawing Sheet

POLYMER COMPOSITES FROM SOLUTION MIXING

POLYMER COMPOSITES FROM SOLUTION MIXING

US 6,555,606 B1

Figure 1:
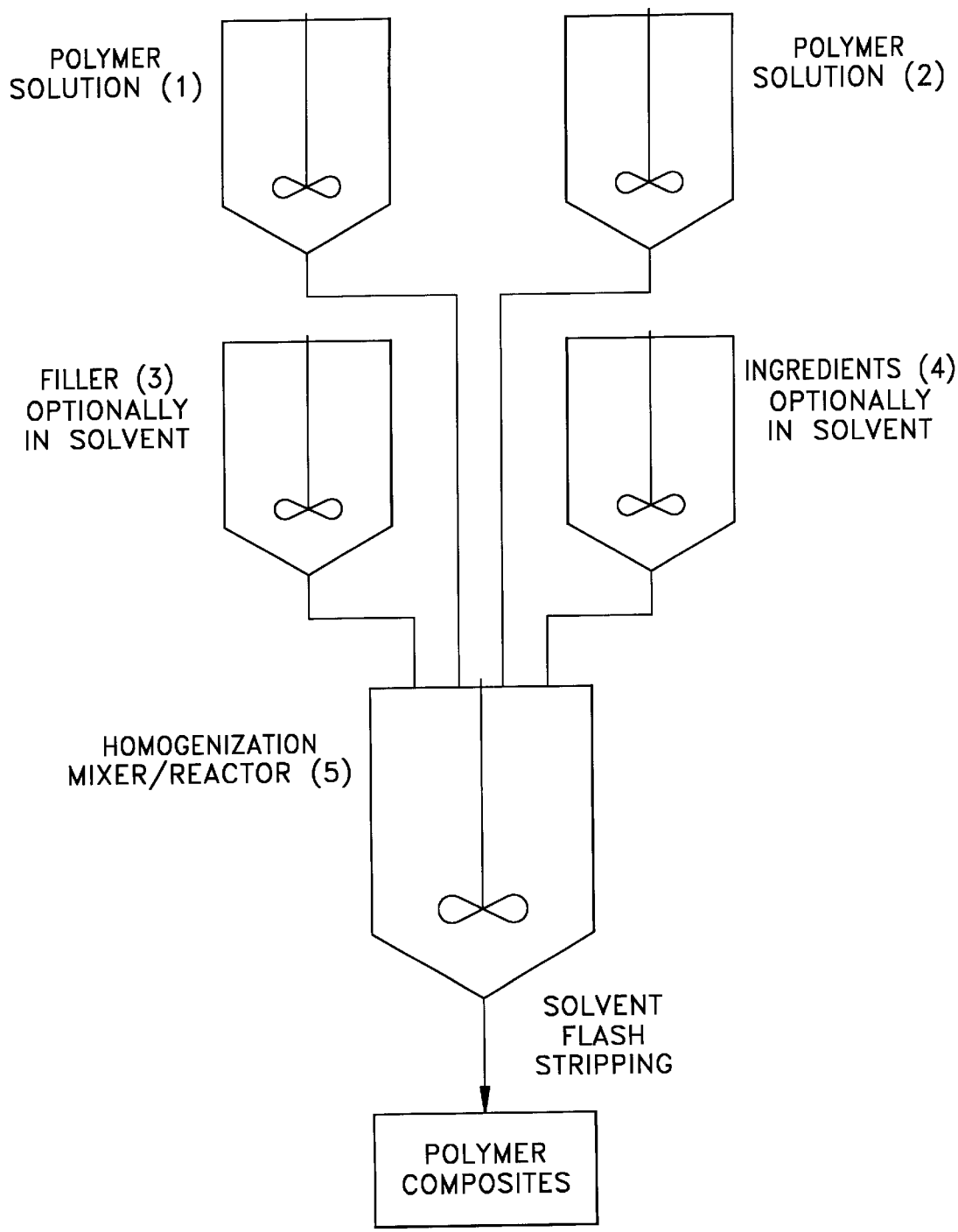

PREPARATION OF RUBBER COMPOSITION BY ORGANIC SOLUTION MIXING AND ARTICLES THEREOF INCLUDING TIRES

FILED OF THE INVENTION

This invention relates to preparation of a rubber composition by pre-mixing at least rubber compounding ingredient with an organic solvent solution of at least one elastomer. The invention also contemplates the use of such rubber composition, or a blend of such rubber composition with additional elastomer(s) and/or rubber compounding ingredients, as a component of an article of manufacture. Such article of manufacture may be, for example, a tire. Such article may also be an industrial product such as, for example, a hose or belt such as a conveyor belt or power transmission belt.

BACKGROUND OF THE INVENTION

Various rubber compounding ingredients, including particulate carbon black reinforcement, is conventionally blended with various elastomers with the aid of various internal mixers, as well as open roll mixers, under high sheer and relative high temperature conditions. Accordingly a considerable amount stress is experienced by the rubber composition as well as expenditure of energy to accomplish the aforesaid mixing.

Alternatively, various rubber compositions have heretofore been prepared by:

(1) first masterbatching various rubber latices with various rubber compounding ingredients which have particularly included rubber reinforcing carbon black under low shear and temperatures followed by (2) blending the masterbatch with additional elastomer(s) and compounding ingredients under high shear and temperature conditions.

For example, see U.S. Pat. Nos. 3,294,733; 3,298,984; 3,317,458; 3,345,324; 3,491,052; 3,767,605 and 3,923,707.

U.S. Pat. No. 3,317,458, for example, relates to masterbatching a combination of carbon black and silica with a rubber latex.

Various rubber compositions have also heretofore been prepared by mixing an aqueous slurry of carbon black with an organic solvent solution of elastomer(s). For example see U.S. Pat. No. 3,350,342.

U.S. Pat. No. 3,304,281, for example, relates to mixing together a solution of one polymer with a latex of another polymer and then coagulating the rubber crumb from the resulting mixture. the process can be used to incorporate an oil and/or carbon black into the polymer. For example, the oil can be introduced as an aqueous emulsion and the oil emulsion mixed with the latex prior to contact with the solution. Alternatively, all three components can be mixed simultaneously. Alternatively, a carbon black aqueous slurry can be added to the solution-latex mixture or it can be mixed with the latex prior to mixing with the solution.

U.S. Pat. No. 3,491,052 for example, relates to mixing an elastomer in an aqueous latex form with a solution of an elastomer which has been dissolved in a water immiscible organic solvent to form a pseudo-emulsion and recovering the mixed elastomers by adding a latex coagulating agent at a temperature sufficient to vaporize the solvent. Alternatively a rubber pigment (e.g.: carbon black) may be dispersed in the pseudo-emulsion prior to coagulation.

U.S. Pat. No. 3,533,988, for example, relates to blending a hydrocarbon solution of rubber with an aqueous suspension of a rubber reinforcing agent, such as carbon black. In its background discussion, it relates that, theretofore, in order to avoid a disagreeableness of handling dry, dusty carbon black with raw rubber on mixing rolls, a method was developed for producing masterbatch by dispersing carbon black directly into a rubber solution produced by monomer polymerization in the presence of a solvent. It further relates that, theretofore, another method was to disperse carbon black in a hydrocarbon and mix the dispersion with the rubber solution.

In the description of this invention, the term "phr" relates to parts by weight of an ingredient per 100 parts by weight of rubber.

The terms "rubber" and "elastomer" are used interchangeably unless otherwise specified.

The term "Tg" relates to a glass transition temperature of an elastomer, normally determined by a differential scanning (DSC) calorimeter with a temperature rise of 10° C. per minute.

DISCLOSURE AND PRACTICE OF THE INVENTION

In accordance with this invention, a process of preparing a rubber composition is provided which comprises:

(A) blending a particulate elastomer-reinforcing filler with an organic solvent solution of a conjugated diene-based elastomer solution and recovering a composition thereof by removing said solvent therefrom wherein said filler is blended therewith in a form of:

(1) particulate elastomer-reinforcing filler exclusive of aqueous or organic dispersion of said filler; and/or (2) particulate elastomer-reinforcing filler as a dispersion thereof in an organic solvent, or (B) spraying an organic solvent solution of a conjugated diene-based elastomer solution onto a particulate elastomer-reinforcing filler and recovering a composition thereof by removing said solvent.

In practice, various rubber compounding ingredients may be included with said filler in either of the above said blending process and/or said spraying process.

In practice, said solvent solution of said elastomer may be a polymerizate.

In further accordance with this invention, said particulate filler is comprised of at least one of carbon black, silica, particularly amorphous silica including precipitated silica and/or fumed silica, carbon black and modified carbon black having silanol groups on the surface thereof.

In additional accordance with this invention, a preferred carbon black and silica have a relatively low apparent density prior to said blending in a range of about 3 to about 300, alternatively about 3 to about 140 g/l. This low density is substantially lower than conventional carbon blacks and silicas which more conventionally have an apparent density in a range of about 500 to about 1000 g/l.

Exemplary of more conventional silicas are precipitated silicas and exemplary of conventional carbon blacks are those in which the carbon black powder has been processed to form very small pellets and which have designations such as, for example, N234, N121, N330, etc which are ASTM designations.

Exemplary of silicas and carbon blacks with the said low apparent densities are, for example, fumed silicas and fine carbon black powers prior to their pelletization to form the said N234, N122 and N330 (for example) designated carbon blacks. Such fine carbon black powders are not normally used for rubber reinforcement purposes, although carbon blacks in the aforesaid pelletized form, with attendant higher apparent densities, are conventionally used for rubber reinforcement purposes.

A significant aspect of using the silica and carbon black powder with very low apparent densities for this invention is to utilize the high absorption capacities of such fillers, particularly where it is desired for the filler to have a greater ability to absorb various ingredients onto its surface and to thereby ultimately provide a resulting free flowing rubber composition.

As previously presented, the process of this invention may involve spraying said organic solvent solution comprised of at least one diene-based elastomer onto said particulate filler.

As a feature of said spraying process, said particulate filler is preferably agitated during said spraying of said solvent solution onto said filler.

As an additional feature of said spraying process, the solvent solution of said elastomer(s) is substantially dried upon said particulate filler as it is being agitated.

In additional accordance with this invention, said suspension, or dispersion, of said filler and said solvent solution of elastomer(s) is heat treated by heating the mixture, while agitating the mixture, to a temperature within a range of about 30° C. to about 150° C., alternatively about 40° C. to about 150° C., for about 2 to about 30, alternatively about 3 to about 20, minutes prior to drying the said composite. It is to be appreciated that the mixture may need to be contained under pressure in a suitable container or under reflux conditions where evaporating solvent is returned to the solution during the heat treatment operation.

In further accordance with this invention, the silica is an amorphous silica which is pre-treated, prior blending with said organic solvent solution of elastomer(s), by reacting said silica, preferably a precipitated silica, with an organosilane of the general formula (I):

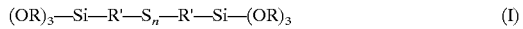

(OR)$_3$—Si—R'—S$_n$—R'—Si—(OR)$_3$ (I)

wherein R is the same or different alkyl radical selected from at least one of ethyl and methyl radicals, preferably the same radicals and preferably an ethyl radical; R' is the same or different radical selected from at least one of ethyl, propyl and butyl radicals, preferably the same radical and preferably a propyl radical; and n is a value from 2 to 6 with an average of from 2 to 2.6 or from 3.5 to 4.

Thus, such organosilane may be a bis(3-alkoxysilylalkyl) polysulfide with an average of from 2 to 2.6 or from 3.5 to 4 connecting sulfur atoms in its polysulfidic bridge. Representative thereof is a bis (3-ethoxysilylpropyl) polysulfide.

In one aspect of the invention, said organic solvent solution of elastomer(s) may be composed of at a multiplicity of least two individual organic solvent solutions of elastomers (i) which are pre-blended prior to addition of said filler(s) or (ii) which at least one of said of elastomer solutions is blended with at least one additional organic solvent elastomer solution subsequent to said filler addition thereto or (iii) which at least one of said elastomer solutions is blended with at least one additional organic solvent elastomer solution substantially simultaneously with said filler addition.

In one aspect of the invention, the said organic solvent solution of at least one elastomer may be a polymerizate (an elastomer together with its solvent in which it has been prepared by polymerization reaction of an appropriate monomer in the presence of a catalyst- which is sometimes referred to as a cement).

In practice, said polymerizate may be polymerizate in which the polymerization reaction has not been terminated and which may be referred to as a living polymetizate. In such case, it is envisioned that, as the polymerization continues, the polymer may interact with the filler to create an improved, or more efficient and integral dispersion of the filler within the elastomer host.

For process step (B) of this invention, in addition to the said addition of said particulate filler in step (A), at least one additional rubber compounding ingredient is blended with said organic solvent solution of said elastomer(s), which may be. before, substantially simultaneously with, or subsequent to, said filler addition, which is comprised of at least one of:

(a) microcrystalline waxes in a range of about 0.1 to about 10 phr;

(b) antioxidant(s) selected from amine-based and phenolic-based antioxidants in a range of about 0.1 to about 10 phr;

(c) sulfur vulcanization accelerator(s) in a range of about 0.1 to about 10 phr;

(d) sulfur vulcanization retarder(s) in a range of about 0.01 to about 5 phr;

(e) sulfur vulcanization activator(s) in a range of about 0.1 to about 10 phr;

(f) rubber processing oil(s) selected from at least one of aromatic, paraffinic and naphthenic rubber processing oils in a range of about 1 to about 60 phr; and (g) sulfur in an amount of about 0.1 to about 3 phr.

Microcrystalline waxes are well known waxes for use in rubber compositions. Such waxes are defined by "The Condensed Chemical Dictionary, Ninth Edition (1970), Page 925 as "A wax, usually branched-chain paraffins, characterized by a crystal structure much small than that of normal wax and also by much higher viscosity".

Representative of commercial microcrystalline waxes are, for example, those available as Akrowax from the Akrochem Company; as an Antilux series of waxes from the Rein Chemie Company; as "Be-Square" 175 Amber Wax from the Petrolite Company; as Beesyn White Wax from the International Wax Company; and as an Okerin series of waxes from the Astor-Wax Company.

Representative examples of antioxidants are amine-based and phenolic based antidegradants. Representative of various commercially available antidegradants may be found, for example in the "1997 Blue Book" published by *Rubber World*, a Lippincott & Peto Publication, Pages 132 through 168, which is intended to incorporated herein by reference.

Representative of such commercially available antidegradants are, for example, diphenyl-p-phenylene-diamine as AgeRite DPPD from the R.T. Vanderbilt Company and octylated diphenyl amines such as AgeRite Statlite from the R.T. Vanderbilt Company.

Additional antidegradants are for example, 2,5-D-t-dibutylhydreoquinone, N-1,3-dimethylbutyl-N'-phenyl-p-phenylenediamine, polymerized 1,2-dihydro-2,2,4-trimethylquinoline, diaryl-p-phenylene diamine, 4,4'-methylene bis 2.6 di tert butylphenol, N,N'-di-3(5-methyl heptyl)-p-phenylenediamine, 2,2-methylene-bis(4-methyl-6-t-butyl phenol), 4,4'-dicumyldiphenylamine, and N-cyclohexylthiophthal imide.

Representative examples of various sulfur vulcanization accelerators are those found in "The Vanderbilt Rubber Handbook" (1978), pages 354–383 and in the "1977 Blue Book", infra, Pages 17 through 74, which are intended to be incorporated herein by reference.

Representative of commercial sulfur vulcanization accelerators are, for example dibenzothiazyl disulfide as Altex from the Elastochem Company; 2-mercaptobenaothiazole as Captax from the Elastochem Company; N-oxydiethylene benzothiazole-2-sulfenamide as Amax from the R.T. Vanderbilt Company; 4-morpholinyl-2-benzothiazole disulfide as Morfax from the R.T. Vanderbilt Company; tetramethylthiuram disulfide as Methyl Tuads from the Elastochem Company; and tetramethylthiuram monosulfide as Unads from the Elastochem Company. Additional vulcanization accelerators are, for example, tetrabutylthiuram disulfide, zinc dibutyldithiocarbamate, thiocarbqamuyl sulfenamide, N-cyclohexyl-2-benzothiazolesulfenamide, N-t-butyl-2-benzothiazole sulfenamide, and diphenylguanidine.

Representative examples of various vulcanization retarders are those found in "The Vanderbilt Rubber Handbook" (1978), infra, Page 403 and in the "1977 Blue Book", infra, Pages 98 through 102, which are intended to be incorporated herein by reference.

Representative of commercial vulcanization retarders is, for example, N-nitrosodiphenylamine from the Sovereign Chemical Company as well as N-cyclohexyl thiophthalimide, magnesium oxide, and N-(cyclohexylthio)-phthalimide.

Representative examples of various vulcanization activators are those found in the "1977 Blue Book", infra, Pages 75 through 97, which are intended to be incorporated herein by reference.

Representative of commercial vulcanization activators are, for example, zinc oxide from the Akrochem Company and stearic acid-rubber grade from the Akrochem Company.

Representative examples of various plasticizers and softeners are those found in the "1977 Blue Book", infra, Pages 179 through 216, which are intended to be incorporated herein by reference.

Representative examples of various vulcanizers are those found in the "1977 Blue Book", infra, Pages 102 through 128, which are intended to be incorporated herein by reference.

Representative of commercial vulcanizers is, for example, sulfur in its different forms as alphasulfur (S8) and/or as insoluble sulfur with or without treatment from the Akrochem Company.

In additional accordance with the process of this invention, particularly where said additional compounding ingredients added to the elastomer solution include zinc oxide, stearic acid, and sulfur, process step (C) is provided which comprises sulfur vulcanizing said recovered rubber composite at a temperature in a range of about 150° C. to about 180° C.

In further accordance with the process of this invention, the resultant rubber composition is blended with at least one additional diene-based elastomer and/or compounding ingredient then sulfur vulcanized.

In additional accordance with the process of this invention, an article of manufacture is prepared having at least one component of the rubber composition of this invention or as blend with at least one additional elastomer and/or compounding ingredient.

In practice, the article of manufacture of this invention may be, for example, a tire or an industrial product such as, for example a hose or belt such as, for example a conveyor belt or power transmission belt.

In additional accordance with this invention a tire is provided having a component of the rubber composition prepared according with this invention.

In additional accordance with this invention a tire is provided having a tread of the rubber composition prepared according with this invention.

It is a significant aspect of this invention that the diene-based elastomer(s) together with one or more of zinc oxide, sulfur, vulcanization accelerator(s) and reinforcing filler may be all mixed together under controlled shear and controlled temperature conditions without being limited by the conventional high shear mixing accompanied by largely uncontrollable, autogenous, temperature increase as experienced in classical internal rubber mixers. This aspect is considered herein as being novel and significant because (1) the polymer.in an organic solvent solution is at a very high, and possibly its highest possible, dispersion state; and (2) various additional compounding ingredients, including particulate reinforcing fillers, particularly said carbon black powder and fumed silica with their aforesaid low apparent densities are also at a very high, and perhaps their highest, dispersion state, namely, as a solution, or dispersion, thereof in an organic solvent.

Particular benefits of the process of this invention are considered herein to be:

(1) A relative minimal amount of additional energy is needed for polymer drying in a case where the polymer is adsorbed onto the filler or the polymer is mixed with the filler.

(2) No additional energy or process step is needed for pelletization of carbon black fillers prior to mixing with the elastomer, namely pellets for carbon black, and granules or small spheres for precipitated silica, especially where the aforesaid carbon black powers, as well as fumed silica, with their low apparent densities are used.

(3) The use of fumed silicas with very low apparent density (ASTM-D1513) may be enabled because such silicas may absorb the solvent and/or elastomer cement solution, thereby transforming the highly dusting silica (due to the silica's low apparent density) to a compacted and more usable material.

(4) Concerns about flaking or pearling of various ingredients to be mixed with the elastomer should be minimized because the ingredients will be dissolved, or dispersed, in the organic solvent and therefore there is no need for a specific physical dry mixing of the utilized ingredients.

(5) Only a relative minimal energy would normally be necessary for dispersing various compounding ingredients in the elastomer because the mixing of specified ingredients will be reduced to a blending of solutions.

(6) An increased uniformity of dispersion of various compounding ingredients, including particulate reinforcing fillers, particularly where such fillers may be hydrophobic in nature, in the elastomer because such materials, as a solution or dispersion in the organic solvent, will be in their most dispersible state and because the blending/mixing in solution has the highest dispersion/blending and homogenizing capability as compared to dry blending the ingredients.

(7) A reduction in amounts of various compounding ingredients needed for the rubber composition formulation is expected because of better anticipated dispersion of a respective compounding ingredients within the elastomer due to solution blending as compared to dry blending of the ingredients.

(8) Better resistance to abrasion is expected for the resulting vulcanized rubber composition which contains particulate amorphous silica for its reinforcement and which has been blended with the elastomer by organic solution mixing.

(9) Better control of various chemical reactions which typically occur during the mixing of various ingredients is expected where organic solution mixing of the associated ingredients is utilized as compared to simple dry mixing of the ingredients under high sheer and elevated temperature mixing in an internal rubber mixer.

As hereinbefore discussed, in further practice of the invention, said diene-based elastomer may be provided in a form of a polymerizate cement of such elastomer.

Indeed, a preferable process according to this invention is the utilization of a polymerizate cement of the elastomer instead of re-dissolving the elastomer in a volatile organic solvent.

In additional practice of this invention, the rubber composition prepared by the process of steps (A), (C) and optionally (B) may be in a form of a pre-formed rubber composition, or composite, which is subsequently mixed under high shear and temperature conditions with at least one additional compounding ingredient comprised of at least one of (1) additional diene-based elastomer(s);
(2) zinc oxide;
(3) sulfur;
(4) vulcanization accelerator(s);
(5) microcrystalline waxes;
(6) antidegradants; and
(7) particulate reinforcing filler(s).

In practice, it may be preferable for a particulate reinforcing filler to be mixed with the elastomer solution, including fillers such as, for example fumed silicas and carbon blacks, to have relatively small apparent densities (ASTM method D-1513) within a range of about 10 g/l to about 300 g/l.

The preference toward relatively small apparent densities for the reinforcing filler(s) is for the fillers to more homogeneously disperse within the organic solvent solution and, ultimately, to disperse more homogeneously within the elastomer within the elastomer itself.

A preference herein toward use of relatively low apparent densities for the reinforcing fillers is to utilize the high absorption capacities of such fillers, particularly where it is desired for the filler to have a greater ability to absorb various ingredients onto its surface and to thereby ultimately provide a resulting free flowing rubber composition. For example, the concentration of such filler in the organic solvent solution may be adjusted so that the solvent may be more readily absorbed by the filler thereby generating a dry composite with acceptable handling properties, namely, as a free flowing granular composite or compacted, for example, to form bales thereof.

In practice, it is often desired that the reinforcing filler is carbon black. While the various conventional, pelletized rubber reinforcing carbon blacks might be used, it is, as hereinbefore discussed, preferred to use an unpelletized carbon black powder having a relatively low apparent density (ASTM method D-1513) before mixing with the elastomer in a range of about 3 to about 140, alternately about 3 to about 300, g/l. Representative of conventional pelletized carbon blacks having higher apparent densities, as hereinbefore discussed, for example, the various N-series of carbon blacks referenced in "The Vanderbilt Rubber Handbook", 13th Edition, 1990, Page 417. It is to be appreciated that desirable carbon black powders for use in this invention are carbon black powders prior to pelletization to form said conventional pelletized carbon blacks.

In practice, it may be desired to use fumed silica with its aforesaid low apparent density.

However, it may sometimes desired to use silicas with the aforesaid higher apparent density such as for example precipitated aluminosilicates, may be used it may sometimes be preferred to use a silica having a relatively high apparent density (ASTM method D-1513) in a range, for example, of about 500 g/l to about 1000 g/l for mixing with the elastomer solution as hereinbefore discussed. Representative of contemplated precipitated silicas are, for example, RP120HD, RP85, Z85MP, Z1165MP, RP240HD and RP200MP from Rhodia; VN2, VN3, and Vetrasil 7000 from Degussa A.G.; Hi-sil 532 from PPG Industries; Zeopol 8745 and 8755 from Huber; Perkasil 233 from Akzo.

In the practice of the invention, various sulfur vulcanizable elastomers may be used, exemplary of which are homopolymers and copolymers of conjugated diene hydrocarbons and copolymers of at least one conjugated diene hydrocarbon with an aromatic vinyl compound selected from styrene and alphamethyl styrene.

Preferred conjugated dienes are isoprene and 1,3-butadiene. Preferred aromatic vinyl compound is styrene.

Representative of various conjugated diene-based elastomers are, for example, cis 1,4-polyisoprene, 1,3-butadiene, styrene/butadiene copolymers, isoprene/ butadiene copolymers, styrene/isoprene/butadiene copolymers and any functionalized versions of them.

Preferably, such conjugated diene-based elastomers are prepared by solvent solution polymerization. In such case, such elastomers may be preferably used in their polymerizate form as hereinbefore discussed, namely in the organic solvent solution in their monomers are polymerized to form the elastomer, so that the elastomers do not have to be re-dissolved in a volatile organic solvent.

Various organic solvents may be used for process step of this invention. Representative of such solvents are, for example, hexane, benzene, toluene, cyclohexane, heptane, and tetrahydrofuran. Preferred solvents are, for example, hexane, cyclohexane and heptane.

The rubber composition prepared by the process of this invention is considered herein as being useful, or advantageous, in the preparation of rubber composition as a component of an article of manufacture, instead of dry-blending, or in combination with dry blending, rubber compounding ingredients with rubber because the expected improved dispersion of dispersed ingredients within the elastomer, including reinforcing fillers, expected improved uniformity of dispersion of respective ingredients within the elastomer; improved energy balance because the typical very high energy needed to dry mixing the ingredients in an internal rubber mixer is replaced by a low energy organic solvent mixing process; more efficient use of respective compounding ingredients within the elastomer, including a reduction of quantity; improved efficiency of mixing ingredients within an elastomer ant therefore improved overall manufacturing efficiency.

As hereinbefore discussed, rubber compositions for this invention may also be prepared by mixing the rubber composition, or composite, prepared by processes (A), (C) and optionally (B) with various sulfur vulcanizable elastomers and/or additional rubber compounding ingredients by compounding by methods generally known in the rubber compounding art, such as mixing in an internal rubber mixer with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 10 phr, if used. Such processing aids can include, for example, aromatic, naphthenic, and/or paraffinic processing oils. Representative silicas may be, for example, hydrated amorphous silicas. Typical amounts of antioxidants comprise about 1 to about 3 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants for the sidewall composition may comprise about 3 to about 6 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The presence and relative amounts of the above additives are considered to be not an aspect of the present invention which is more primarily directed to the masterbatch preparation, in an organic solvent solution, of a pre-formed composite and the further preparation and use of rubber compositions which contain such pre-formed composite.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators, including primary and optionally secondary accelerators, are used to control the time and/or temperature required for vulcanization and to improve the properties of the vulcanizate. Often accelerators are used in an amount ranging from about 0.5 to about 2.0 phr. Such accelerators may be, for example, various amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Sometimes a combination of antioxidants, antiozonants and waxes may be collectively referred to as "antidegradants".

The presence and relative amounts of the respective compounding ingredients are riot necessarily considered to be an aspect of this invention, except where noted, and except that a practice of this invention is expect to result in a more efficient use of some of the ingredients, as hereinbefore discussed, which may result, in some cases, in a reduction on amounts of use of some ingredients.

A tire can be built, shaped, molded and cured by various methods, which will be readily apparent to those having skill in such art.

The prepared tire of this invention is conventionally shaped and cured by methods known to those having skill in such art.

For further illustration of the invention, the following drawings are presented which are not intended to be limiting as to the invention.

FIG. 1 is a schematic diagram of solvent preparation of an elastomer composite, which is entitled "Polymer Composites From Solution Mixing".

In particular, with reference to FIG. 1, a polymer solution (1) and, optionally, a polymer solution (2) is fed from its (their) respective associated container(s), within which may be an agitated solution, to an homogenization mixer (5). It is to be appreciated that the polymer solution (1) and/or polymer solution (2) may be a polymerizate.

In addition, a filler (3) such as carbon black powder with a low apparent density in a range of about 3 to about 140 g/l, and optionally in an organic solvent dispersion thereof, is fed from its associated container, within which it may be agitated, to said homogenization mixer (5) and thereby mixed with said polymer(s) (1) and/or (2).

Further, ingredient(s) (4), such as for example, zinc oxide, stearic acid, sulfur and vulcanization accelerator(s) may be fed from its (their) respective container, preferably in an organic solvent, within which it (they) may be agitated, to said homogenization mixer/reactor (5) and thereby mixed with said elastomer(s) (1) and/or (2) and said filler (3).

Thereafter, the mixture is removed from said homogenization mixer, and the solvent removed by flashing to recover the polymer composite(s) as depicted in the FIG. 1.

In practice, the recovered polymer composite may be used as a component of an article of manufacture such as, for example, a component of a tire and/or industrial product. Such tire component may be, for example and without limitation, a tire tread, sidewall, apex or other sidewall insert, or wire coat compound. Such industrial product may be, for example and without limitation, a hose, conveyor belt or power transmission belt.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a rubber composition comprised of at least one elastomer and a particulate, elastomer-reinforcing, filler, wherein said process comprises:
   (A) blending a solution of at least one conjugated diene-based elastomer in an organic solvent with:
      (1) at least one of elastomer-reinforcing filler as dispersion thereof in an organic solvent, wherein said filler is selected from at least one of the group consisting of carbon black and pre-treated amorphous silica, and
      (2) at least one additional rubber compounding ingredient in a solution of said ingredient in an organic solvent, and
   (B) recovering said elastomer, filler and additional ingredient as an elastomer composite thereof by removing said solvent(s);
   wherein said additional ingredient is comprised of at least one of zinc oxide, stearic acid, sulfur, a vulcanization accelerator selected from dibenzothiazyl disulfide, 2-mercaptobenaothiazole, N-oxydiethylene benzothiazole-2-sulfenamide, 4-morpholinyl-2-benzothiazole disulfide, tetramethylthiuram disulfide, tetramethylthiuram monosulfide, tetrabutylthiuram disulfide, zinc dibutyldithiocarbamate, thiocarbqamuyl sulfenamide, N-cyclohexyl-2-benzothiazolesulfenamide, N-t-butyl-2-benzothiazole sulfenamide and diphenylguanidine; and a vulcanization retarder selected from N-nitrosodiphenylamine, N-cyclohexyl thiophthalimide, magnesium oxide, N-(cyclohexylthio)-phthalimide, and wherein said pre-treated amorphous silica is prepared prior to blending with said solution of elastomer(s), by reacting an amorphous silica with an organosilane of the general formula (I):

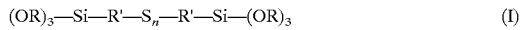

(OR)$_3$—Si—R'—S$_n$—R'—Si—(OR)$_3$ (I)

wherein R is the same or different alkyl radical selected from at least one of ethyl and methyl radicals; R' is the same or different radical selected from at least one of ethyl, propyl and butyl radicals; and n is a value from 2 to 6 with an average of from 2 to 2.6 or from 3.5 to 4.

2. The process of claim 1 wherein said additional ingredient is a sulfur vulcanization accelerator selected from dibenzothiazyl disulfide; 2-mercaptobenaothiazole; N-oxydiethylene benzothiazole-2-sulfenamide; 4-morpholinyl-2-benzothiazole disulfide; tetramethylthiuram disulfide, tetramethylthiuram monosulfide, zinc dibutyldithiocarbamate, thiocarbqamuyl sulfenamide, N-cyclohexyl-2-benzothiazolesulfenamide, N-t-butyl-2-benzothiazole sulfenamide, diphenylguanidine and mixtures thereof.

3. The process of claim 1 wherein said additional ingredient is a vulcanization retarder selected from N-nitrosodiphenylamine; N-cyclohexyl thiophthalimide, magnesium oxide and N-(cyclohexylthio)-phthalimide and mixtures thereof.

4. The process of claim 1 wherein said additional ingredients are a combination of zinc oxide, stearic acid, and sulfur and wherein said recovered elastomer composite thereof is sulfur vulcanized at a temperature in a range of about 150° C. to about 180° C.

5. The process of claim 1 wherein said elastomer solution is a blend of at least two elastomer solutions.

6. The process of claim 1 wherein said elastomer solution is an elastomer polymerizate.

* * * * *

UNITED STATES PATENT AND TRADEMARK OFFICE
CERTIFICATE OF CORRECTION

PATENT NO.    : 6,555,606 B1
DATED         : April 29, 2003
INVENTOR(S)   : Giorgio Agostini et al.

It is certified that error appears in the above-identified patent and that said Letters Patent is hereby corrected as shown below:

Column 1,
Line 50, delete "the" and substitute -- The -- therefore

Column 2,
Line 63, delete "powers" and substitute -- powders -- therefore

Column 3,
Line 49, delete "(3-ethoxysilyipropyl)" and substitute -- (3-ethoxysilylpropyl) -- therefore
Line 51, delete "at"
Line 52, insert "at" between "of" and "least"

Column 4,
Line 1, delete "-" and substitute -- , -- therefore
Line 3, add -- a -- between "be" and "polymerizate"
Line 64, delete "N-cyclohexylthiophthal imide" and substitute
-- N-cyclohexylthiophthalimide -- therefore Column 5,
Line 14, delete "thiocarbqamuyl" and substitute -- thiocarbamyl -- therefor
Lines 22 and 42, delete "is" and substitute -- are -- therefore Column 6,
Line 13, delete "." between "polymer" and "in"
Line 32, delete "powers" and substitute -- powders -- therefor Column 7,
Line 17, add -- an -- between "In" and "additional"

Column 8,
Line 5, add -- be -- between "sometimes" and "desired"
Line 14, delete "Vetrasil" and substitute -- Ultrasil -- therefore
Line 57, delete "ant" and substitute -- and -- therefore Column 9,
Line 59, delete "riot" and substitute -- not -- therefore

UNITED STATES PATENT AND TRADEMARK OFFICE
CERTIFICATE OF CORRECTION

PATENT NO.    : 6,555,606 B1
DATED         : April 29, 2003
INVENTOR(S)   : Giorgio Agostini et al.

It is certified that error appears in the above-identified patent and that said Letters Patent is hereby corrected as shown below:

Column 11,
Line 1, delete "thiocarbqamuyl" and substitute -- thiocarbamyl -- therefor Column 12,
Line 4, delete "thiocarbqamuyl" and substitute -- thiocarbamyl -- therefor Signed and Sealed this Twenty-first Day of October, 2003

JAMES E. ROGAN
*Director of the United States Patent and Trademark Office*